No. 699,236. Patented May 6, 1902.
L. REASER.
HOOK AND EYE.
(Application filed Feb. 5, 1902.)

(No Model.)

Witnesses
D. M. Stewart
Caleb J. Dieter

Lewis Reaser
Inventor by
Attorney

United States Patent Office.

LEWIS REASER, OF READING, PENNSYLVANIA.

HOOK AND EYE.

SPECIFICATION forming part of Letters Patent No. 699,236, dated May 6, 1902.

Application filed February 5, 1902. Serial No. 92,609. (No model.)

*To all whom it may concern:*

Be it known that I, LEWIS REASER, a citizen of the United States of America, and a resident of Reading, in the county of Berks and State of Pennsylvania, have invented certain new and useful Improvements in Hooks and Eyes, of which the following is a specification.

My invention relates to certain new and useful improvements in hooks and eyes, which are fully described in connection with the accompanying drawings and the novel features of which are specifically pointed out in the claims.

Figure 1:
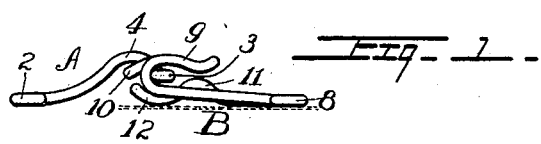
Figure 2:
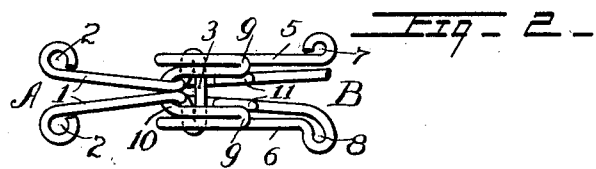

Figure 1 is an elevation or edge view of the two members of an improved device embodying my invention shown in engagement with each other. Fig. 2 is a plan view of the same.

As shown in the drawings, the opposite members A and B are formed of wire. The member A comprises a double wire shank portion 1, having securing-loops 2 and 2 for attachment to one edge of the material, and a T-shaped head portion 3, formed by oppositely bending and doubling the two shank-wires, as shown. The shank-wires 1 incline upward from the plane of the securing-loops 2 2, and the transverse head portion 3 is turned downward toward said plane by jointly bending said shank-wires adjacent to the head, as indicated at 4. The member B is formed at one end of its base, formed by the arms 5 and 6, with similar securing-loops 7 and 8 and at the other end of said base with twin hook-shaped arms 9 9, which rise from opposite sides of the base and each formed by a close return-bend of the upwardly and rearwardly bent outer wires 9 9, said hook-shaped arms being connected by the bar or cross-wire 10 and spaced apart a distance slightly greater than the downwardly-bent shank 4 of the member A, so as to permit the free passage of the latter between them, while the rear ends of the arms are somewhat raised to facilitate the passage thereunder of the T-head 3. As a guard against the unintentional disengagement of the member A and for the further purpose of supporting the forward part of the member B in somewhat elevated position above the material to which it is secured, (which material is indicated in dotted lines in Fig. 1,) so as to permit the more easy engagement of the member A therewith, I provide a spring-supporting, preferably approximately U-shaped, guard 11 12, located below the arms 9 9 and formed, as shown, by a forward continuation and return of the wire beyond the securing-loop 8, said supporting-guard comprising a raised guard 11, (preferably formed by bending the wire on each side thereof upward and downward, as shown,) which coöperates with the upper portions of the hook-shaped arms 9 9 to form contracted mouths to the latter, respectively, and which requires to be slightly depressed in order to permit the passage of the head 3 of member A and an extension 12, which extends below the plane of the base of said member and is arranged to bear upon the material and constitutes a support which maintains the forward end of member B in slightly-elevated position, as already explained.

The twin hook-shaped arms 9 9 form between them a guideway for the downwardly-bent shank portion 4 of the member A when the latter is being moved into engagement with said arms, and when the T-shaped head is drawn against these hooked arms the engaged members are naturally maintained in alinement. These twin arms, moreover, are easily found by the engaging member in any case, and particularly so when held above the material of the garment by the supporting-guard 11 12.

What I claim is—

1. A member of a hook-and-eye device formed from a single piece of wire bent to form a base, hook-shaped arms rising from opposite sides of one end of said base, a bar connecting said arms together and an approximately U-shaped support having each of its two sides designed to engage the material to which the member is secured, said support being bent to bring both of its said sides near its closed end below the plane of the base.

2. A hook and eye, comprising a member with a downwardly-bent T-shaped head, and an engaging member having a base and formed with hook-shaped arms for engaging said head and with a support which extends below the plane of said base and is adapted to hold the contiguous portion of said member elevated above the material to which the member is secured.

3. A hook and eye, comprising a member having a downwardly-bent T-shaped head, and an engaging member having a base and provided with hook-shaped arms which rise from opposite sides of one end of said base and are connected with each other, said engaging member also having a supporting-guard which underlies said arms and projects above and below the plane of said base.

4. A member of a hook-and-eye device formed from a single piece of wire bent to form a base, hook-shaped arms rising from opposite sides of one end of said base, a bar connecting said arms together and an approximately U-shaped supporting-guard which is located below the plane of the upper portions of said hook-shaped arms and has each of its sides formed with bends, coöperating with said hook-shaped arms to form contracted mouths to the latter, said guard being also bent to extend below the plane of said base.

5. A hook and eye, comprising a member having a downwardly-bent T-shaped head, and an engaging or opposite member formed from a single piece of wire bent to form a base, hook-shaped arms rising from opposite sides of one end of said base, a bar connecting said arms together and an approximately U-shaped supporting-guard which is located below the plane of the upper portions of said arms and has each of its sides formed with bends which coöperate with said hook-shaped arms to form contracted mouths to the latter, said guard having its closed end bent to extend below the plane of said base at each side, for the purpose specified.

Signed at Reading, Pennsylvania, this 20th day of January, 1902.

LEWIS REASER.

Witnesses:
J. MILTON MILLER,
W. G. STEWART.